Figure 1:
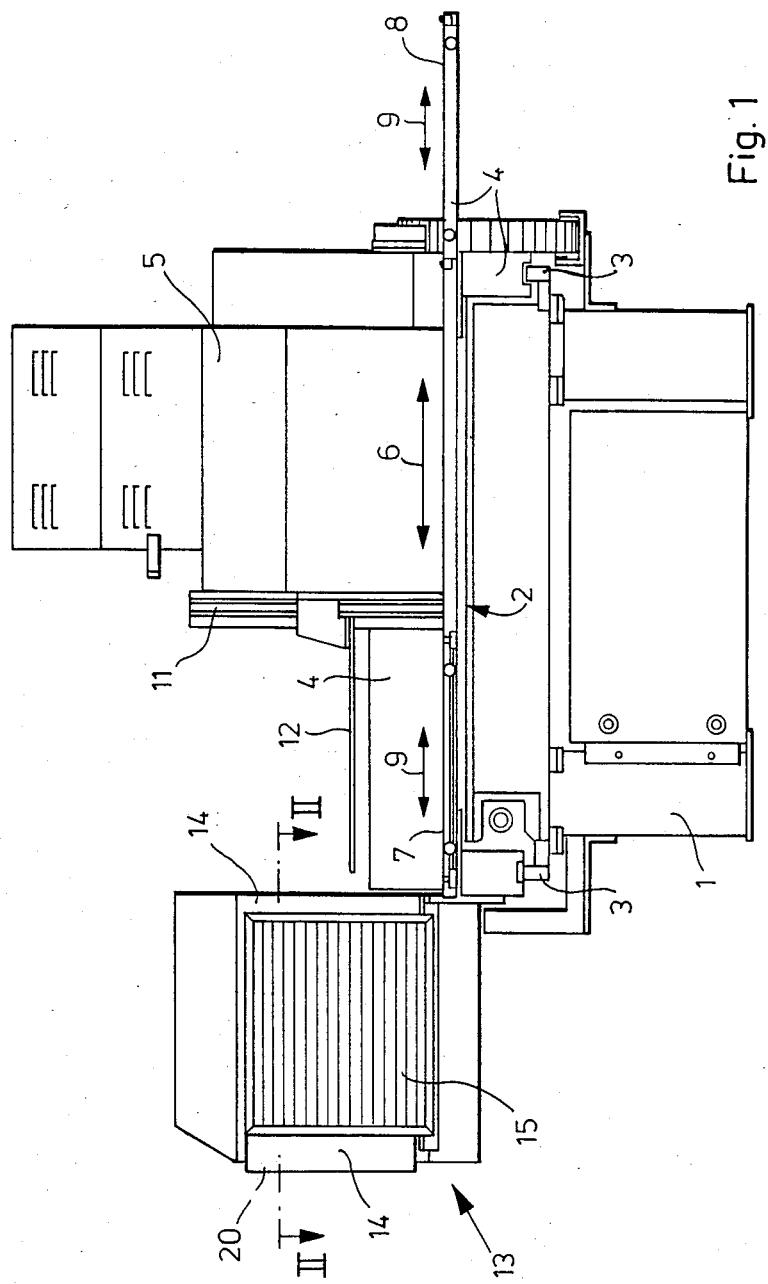

United States Patent [19]

Weag

[11] Patent Number: 4,664,510

[45] Date of Patent: May 12, 1987

[54] REPEATING COPYING MACHINE

[75] Inventor: Ernst Weag, VS-Pfaffenweiler, Fed. Rep. of Germany

[73] Assignee: B. Bacher GmbH, Wurmlingen, Fed. Rep. of Germany

[21] Appl. No.: 846,871

[22] Filed: Apr. 1, 1986

[30] Foreign Application Priority Data

Oct. 11, 1985 [DE] Fed. Rep. of Germany ... 8528934[U]

[51] Int. Cl.$^4$ ............................................. G03B 27/04
[52] U.S. Cl. ........................................ 355/86; 355/99; 355/102
[58] Field of Search ................. 355/100, 102, 99, 103, 355/85, 86

[56] References Cited

U.S. PATENT DOCUMENTS

| | | | |
|---|---|---|---|
| 3,503,679 | 3/1970 | Kawarabayashi et al. | 355/102 X |
| 3,535,039 | 10/1970 | Lakin et al. | 355/100 |
| 3,751,164 | 8/1973 | Miller et al. | 355/100 |
| 4,541,714 | 9/1985 | Miyamoto | 355/99 |
| 4,547,066 | 10/1985 | Murai | 355/100 X |
| 4,565,443 | 1/1986 | Yazaki | 355/99 |
| 4,583,838 | 4/1986 | Machida et al. | 355/85 X |

Primary Examiner—Richard A. Wintercorn
Attorney, Agent, or Firm—Pretty, Schroeder, Brueggemann & Clark

[57] ABSTRACT

The exposure head of a repeating copying machine is disposed on a slide, with the exposure head being able to be traversed on a table of the copying machine by means of the slide and having a master carriage, an exit carriage and feed means, with a magazine having individual compartments for masters being attached at that end of the slide that is adjacent to the master carriage. The magazine and the feed means are mutually adjustable one relative to the other in both the vertical and horizontal planes, thereby permitting the feed means to be brought into engagement with any of the masters contained in the individual compartments of the magazine for the purpose of removing the master from the magazine and transferring it to the master carriage.

8 Claims, 4 Drawing Figures

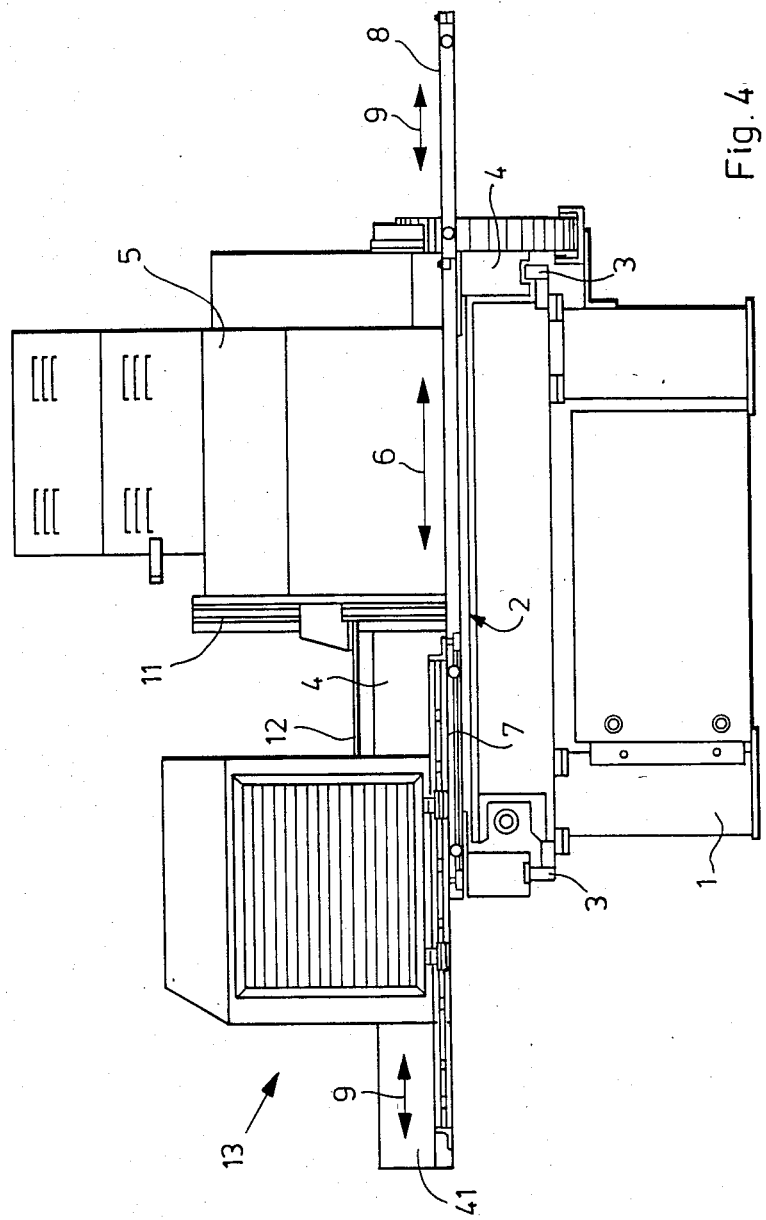

REPEATING COPYING MACHINE

The present invention relates to a repeating copying machine comprising an exposure head disposed on a slide, with the exposure head being able to be traversed on a machine table by means of the slide and having a master carriage, an exit carriage and feed means arranged for the purpose of transferring masters from a stack of masters attached at that end of the slide which is adjacent to the master carriage to the exit carriage.

Repeating copying machines of this nature are marketed in various embodiments. Simpler repeating copying machines do not have any feed means, but only a master carriage, upon which the master must be laid by hand, possibly together with a mask. Positioning means, in particular register pins, ensure that the master assumes a given attitude, with a high degree of accuracy, relative to the master carriage. After the master has been positioned, the master carriage, which is initially located adjacent to the exposure head, is then traversed into the exposure head, where the master is transferred from the master carriage to the master holder by means of a vacuum, whereupon the master carriage retracts from the exposure head again. The master is then positioned on the material to which the master is to be copied, which is located on the machine table, and this material is then exposed. The exposure can be performed a plurality of times, one after another, with the exposure head in various positions relative to the machine table. Following the final exposure procedure, the exit carriage traverses into the exposure head; the master is then placed on the exit carriage and the exit carriage is retracted from the exposure head together with the master, which can then be removed by the personnel supervising the machine.

This repeating copying machine is employed primarily for copying the same master to the material, in particular a printing plate, a plurality of times with proper register in order to reproduce the same image on the material a plurality of times. The high accuracy with which the images are positioned on the material has resulted in repeating copying machines of this nature also being employed in the production of printing plates which required a plurality of different images to be located in highly differing, irregularly distributed locations. Thus, the copying machine was employed to perform certain paste-up tasks. Moreover, their high positioning accuracy further led repeating copying machines of this nature to also be employed in the production of printing plates for multi-color printing processes. Here, too, their high positioning accuracy permitted printing plates to be produced with a plurality of differing and randomly distributed images, with a high degree of register accuracy. In the case of these tasks, the object was no longer to produce a plurality of copies from one and the same master on the same plate, staggered mutually one relative to the other in accordance with a given module; instead, it was necessary to change the master for each individual exposure. Consequently, carriages were sought which would eliminate the need to manually lay the masters and which would permit automated insertion of a variety of masters in accordance with a given program. One solution for this object was to arrange a stack of masters adjacent to the location in which the master carriage is positioned outside the exposure head by stacking the masters required for the production of a printing plate, a film, or any other material to which the master is to be copied, in a given sequence, with the attitude of the stack being able to be defined by means of appropriate register pins, for example. Moreover, a feed means, another vacuum means, for example, was disposed on the exposure head; the feed means could be positioned over the stack of masters by appropriately traversing the exposure head, thus permitting the top master to be removed from the stack and positioned over the master carriage by appropriately traversing the exposure head. The master could then be placed on the master carriage by blowing it off, for example, with introduction of the master, exposure of the printing plate and removal of the master by means of the exit carriage then finally being effected in the above-described manner. The masters to be stacked frequently consist of a transparent carrier film, on which films containing the positive or negative images to be copied are pasted up. The resulting, multi-ply masters are not plane. Consequently, stacks formed from such masters are not uniform. Since the films and masks normally cover only center portions of the carrier film, the masters are thinner at the edges, thus causing the center of the stack to become more and more convex as the height of the stack increases. This impairs the positioning accuracy of the individual masters while they are in the stack and when they are transferred to the feed means or the master holder. The convexity of the masters can prevent a uniform vacuum effect from being achieved throughout the entire surface. As a result, adhesion is insufficient and there is a risk of the position of the master being changed during the exposure procedure or air inclusions reducing the copying quality. On the other hand, there is also a risk of masters that comprise large films clinging one to the other, especially as a result of electrostatic forces, thereby causing two or even more masters to be removed by the feed means. These possible malfunctions preclude the possibility of being able to operate a repeating copying machine of this nature in a largely automated manner; on the contrary, the copying machine must be constantly supervised by personnel, so that no significant advantage is achieved in terms of personnel, in spite of the relatively high degree of sophistication of the mechanical and electronic operating and control means as opposed to manual placement of the masters on the master carriage.

It is the object of the present invention to design a repeating copying machine of the type cited at the outset in such a manner that no malfunctions can occur in conjunction with transfer of the masters from a stack of masters to the master carriage by a feed means, so as to enable virtually fully automated operation, in which a plurality of preselected masters can be copied to given locations on a film, a printing plate, etc. in accordance with a given program, without constant personnel supervision being required.

According to the present invention, this object is solved in that a magazine is disposed at that end of the slide that is adjacent to the master carriage, the magazine having individual compartments for the masters and the magazine and the feed means being mutually adjustable one relative to the other in both the vertical and horizontal planes, thereby permitting the feed means to be brought into engagement with any of the masters contained in the individual compartments of the magazine for the purpose of removing the master from the magazine and transferring it to the master carriage.

Consequently, in the repeating copying machine according to the present invention, the masters to be copied one after the other are not stacked one upon the other, but deposited in the individual compartments of a magazine, so that the individual masters lie just as plane and as easily accessible in the magazine as subsequently on the master carriage. Consequently, the feed means can therefore operate generally in the same manner as the arrangement contained in the exposure head for removing the master from the master carriage and subsequently transferring the master to the exit carriage. The technique developed herefor ensures a high degree of transfer accuracy. It is impossible for malfunctions to be caused by other masters, as each master lies individually, independently of the others, and can be identified individually. The relative shift between magazine and feed means permits any desired compartment of the magazine to be accessed, thereby eliminating the need for a given sequence of the masters in the stack, i.e. in the compartments of the magazine, arranged one above the other, in this case. Access to the compartments can readily be programmed in any desired sequence through known control means. Moreover, it is also possible to quickly modify a program of this nature if a master is to be substituted, and it is also possible, in principle, to load the magazine while the repeating copying machine is in operation, in particular during the exposure phases.

The mechanical link between magazine and exposure head that is required for transfer of the master necessitates that the magazine be attached to the slide with which the exposure head can be traversed over the machine table. However the magazine can readily be mounted in a vertically adjustable manner in a guideway attached at the end of the slide, while the feed means is rigidly attached to that side of the exposure head which faces the magazine. After the magazine has been set to a given height, the feed means can then be introduced into the magazine by traversing the exposure head to it, thereby permitting the appropriate master contained in the magazine to be grasped and then withdrawn from the magazine when the exposure head retracts. The particular advantage offered by this arrangement is that it is the easiest with which the existing repeating copying machine can be retrofitted, as the feed means on the movable exposure head needs only to be attached in a rigid manner, while the magazine and its guideway can be attached to the end of the slide, which generally offers sufficient stability for this purpose and whose end is easily accessible for assembly of the guideway with the magazine.

In another embodiment of the present invention, however, the magazine is rigidly attached to the slide in the vertical direction and the feed means is mounted in a vertically adjustable manner on that side of the exposure head which faces the magazine. Here, the feed means is set to the individual compartments of the magazine by shifting the feed means attached to the exposure head. Otherwise, the theory of operation is the same as in the case of the previously discussed embodiment. However the particular advantage that is offered by this embodiment is that the magazine is located in a fixed position, in which it is easily accessible at all times and in which it can also be reloaded while the repeating copying machine is in operation. At the same time, mounting the lighter feed means entails less sophistication than mounting and shifting the heavier magazine.

A very particular advantage that is offered by this embodiment, however, is that the present invention can be further designed in such a manner as to permit the magazine to be traversed on the slide in the same direction as the exposure head and the magazine can be made to traverse conjointly with the exposure head. While, in the case of the other two embodiments of the present invention, it is necessary for the exposure procedure to have been completed and the last master to be processed to have been placed on the exit carriage before the exposure head and the feed means attached thereto can traverse to the magazine in order to remove a new master therefrom, the teaching of mounting the magazine movably on the slide permits the magazine to be traversed to the exposure head and the appropriate master to be picked up by the feed means, which has previously been elevated to the correct height, while the exposure procedure is still in process, thus enabling the individual operating steps to be overlapped, which significantly accelerates the operating process.

In principle, the feed means can be designed in any desired manner. Paper and film processing techniques incorporate many means for grasping and transferring individual masters from a magazine to an operating position. Thus, for example, customary gripper arrangements can be employed, possibly in conjunction with blowing and vacuum means. A prerequisite herefor is that they not necessitate excessive headroom in order to be able to selectively engage the masters that are stored in individual compartments. In the case of the embodiment with the vertically adjustable magazine, for example, it would be conceivable to provide transport rollers as the fixedly arranged feed means, with the master being introduced therein by advancing means connected with the magazine. However here, too, it will usually most likely be simplest to employ a vacuum plate of the type that is generally used in the exposure heads of repeating copying machines for removing the master from the master carriage and placing it on the exit carriage, thereby permitting proven techniques to be utilized here.

Moreover, many embodiments are also conceivable for the magazine of the repeating copying machine according to the present invention. A magazine that comprises a rack with a plurality of plates arranged in horizontal guide members, with the plates being employed as carriers for the masters, as well as with means for defining the attitude of the masters, in particular comprising register pins, is an especially proven solution. The employment of a plurality of plates of this nature offers the particular advantage of being able to place the masters on the plates and define their attitude thereon outside the magazine, where these tasks are not impeded by spatial constraints, as well as the further advantage that, because of their stability, the plates serve as a good support for the masters and can easily be introduced into the magazine. At the same time, they also ensure proper separation of the individual masters one from the other.

In a preferred embodiment of the present invention, the guide members are open at an end facing that side of the magazine which is accessible from the exterior, preferably that side which faces away from the exposure head. Moreover, stops are disposed on the plates, the stops coming into a contacting relationship with appropriate abutments attached to the rack when the plates are in their desired position in the rack. And, finally, spring members are attached to the rack, which force the plates into the desired position.

In this embodiment of the present invention, the plates can thus be individually pushed into the open ends of the guide members and forced against the abutments attached to the rack, in their desired position, by means of spring members, thereby causing the plates to automatically assume the desired position when they are introduced and to be dependably retained therein. In this manner, a very high degree of operating accuracy is achieved. Nevertheless, the plates can be removed very easily by withdrawing them from the guide members after a by no means excessive force has been overcome when they are to be loaded with new masters. As already mentioned above, these tasks can very easily be performed while the repeating copying machine is in operation, thus eliminating the need for any interruption of operation whatsoever for the purpose of reloading the magazine.

In an embodiment of the present invention that is preferred because of its simplicity and reliability, the stops are arranged at the ends of that edge of the plates which is adjacent to the open ends of the guide members, with spring strips which are attached to the rack and arranged vertically relative to the plates engaging over the stops.

Figure 2:
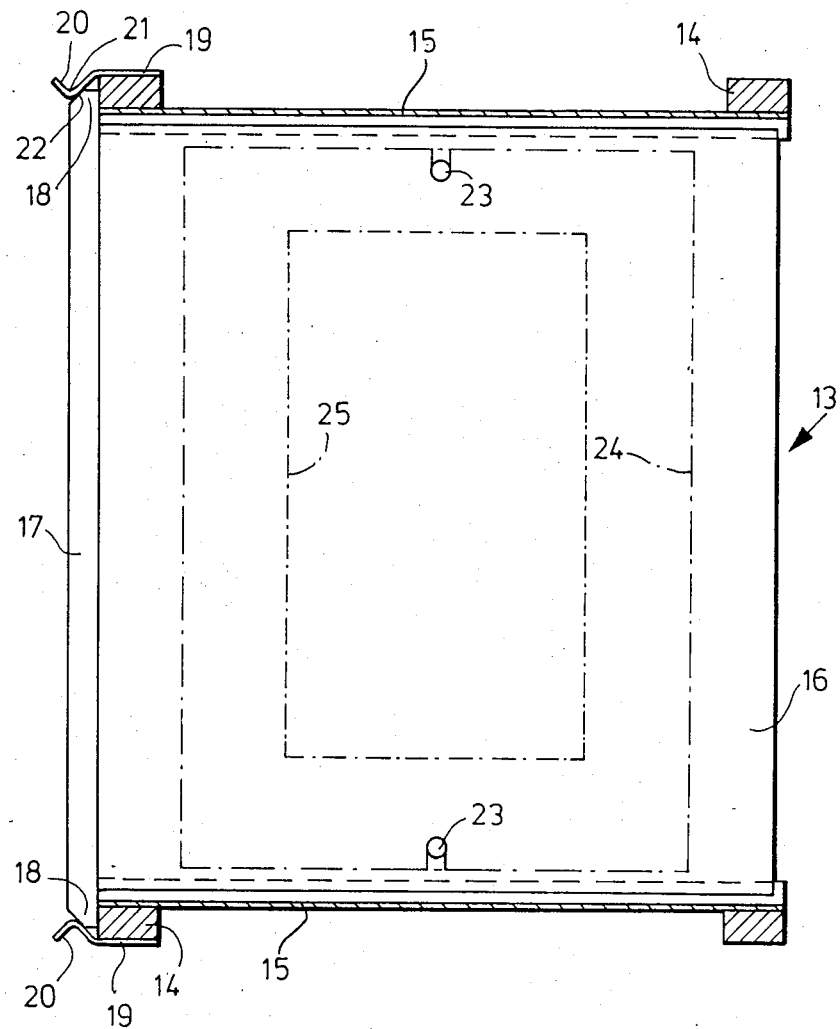
Figure 3:
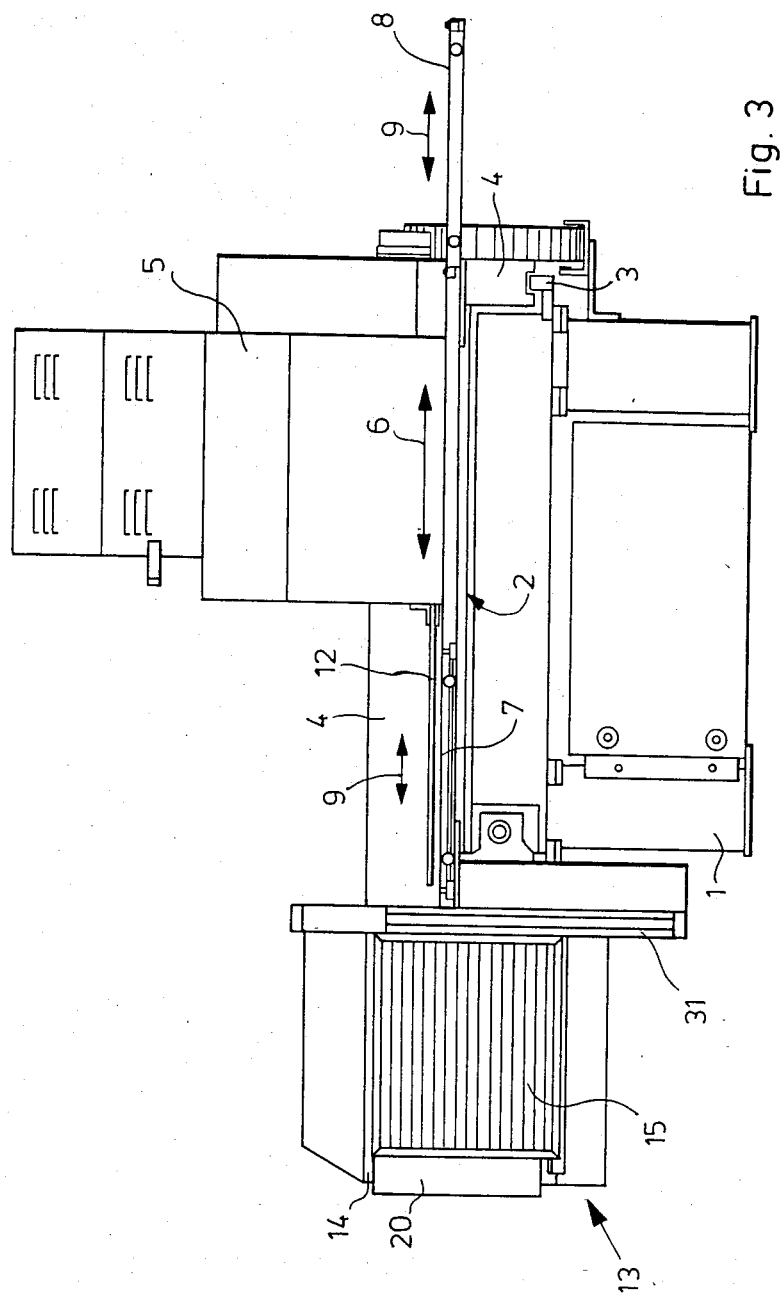

The above discussed and other objects, features and advantages of the present invention will become more apparent from the following description thereof, when taken in connection with the practical examples shown in the accompanying drawings, in which FIG. 1 shows a schematic representation of a side view of a first repeating copying machine according to the present invention;

FIG. 2 shows a schematic representation of a section taken along Line II—II through the magazine of the repeating copying machine according to FIG. 1, on a larger scale; and FIGS. 3 and 4 show schematic representations of side views of further embodiments of the repeating copying machine according to the present invention, similar to the embodiment illustrated in FIG. 1.

Referring now to the drawings, wherein like reference numerals designate like parts throughout the several views, the repeating copying machine shown in FIG. 1 has a machine table 1, whose top 2 forms a surface for depositing the unillustrated copies, i.e. in particular a printing plate. A slide 4 is shiftably mounted on a guideway 3, the direction of slide 4 being perpendicular to the plane of the drawing in FIG. 1. An exposure head 5 is shiftably mounted on slide 4 in such a manner as to permit it to traverse at right angles to machine table 1, in the direction of arrow 6. Consequently, exposure head 5 can be traversed in two mutually perpendicular directions relative to machine table 1 and the working surface formed by top 2 thereof, thereby permitting every portion of top 2 to be exposed by the means present in exposure head 5, within a given area.

One side of exposure head 5 has a master carriage 7, which can be traversed into exposure head 5 from its position outside the exposure head that is illustrated in FIG. 1. A corresponding exit carriage 8 is located on the opposite side of exposure head 5. The exit carriage, too, can be traversed into the interior of exposure head 5 from its illustrated external position. This possible motion is suggested by means of arrows 9. To this extent, the illustrated repeating copying machine represents the state of the art, thereby eliminating the need for a further discussion of its details. However the fact should also be mentioned that an unillustrated master frame is contained within exposure head 5, with the masters that have been placed on the master carriage being transferred to the master frame after the master carriage has traversed into the exposure head. After the master has been processed in the exposure head, the master is blown from the master frame, thus causing it to be transferred to exit carriage 8. Exit carriage 8, which had previously traversed into exposure head 5, then retracts out of exposure head 5 together with the master it has picked up, at which time the master can then be removed.

In the illustrated practical example according to the present invention, a vertical guideway 11 for a vacuum plate 12 is attached to that side of exposure head 5 on which master carriage 7 is located. A magazine 13 is located at the end of slide 4 on the same side of exposure head 5. As can be seen from FIG. 2, in particular, magazine 13 comprises a rack having four corner posts 14, connected one with the other, in pairs, by means of angle rails 15 which extend parallel to the direction of motion of exposure head 5. Angle rails 15 serve as horizontal guide members for plates 16, one edge of which has a strip 17. The protruding ends of strip 17 form stops 18, which come into a contacting relationship with outer corner posts 14 when plates 16 are in their desired position, with corner posts 14 thus serving as abutments for determining the desired position of plates 16. Spring strips 19 are attached to the outsides of outer posts 14; the tongue-like protruding ends 20 of spring strips 19 engage over the strips attached to plates 16, with nose-like projections 21 coming into a contacting relationship with the bevels 22 that are disposed at the ends 18 of strips 17, thereby causing tongue-like ends 20 to exert a force upon strips 17 of plates 16 that both causes plates 16 to come into a contacting relationship with the abutments formed by corner posts 14 and centers plates 16. This ensures that plates 16 always assume a defined desired position within magazine 13. Disposed on plates 16 are register pins 23, which govern the attitude of a master 24, suggested by means of the dash-dotted lines in FIG. 2, on plate 16. Master 24 can have a mask 25. However it would also be possible to place different masks 25 separately on plates 16 in magazine 13 and on master carriage 7, which would then only be introduced into exposure head 5 together with a master.

It can readily be seen that, by shifting vacuum plate 12 longitudinally along vertical guideway 11, it can be set to any desired compartment of magazine 13 that is formed by angle rails 15 and plates 16 resting thereupon. Vacuum plate 12 can then be introduced into the corresponding compartment by traversing exposure head 5 against magazine 13. At the same time, it is necessary for master carriage 7 to be traversed into exposure head 5. Consequently, the master and/or mask lying on that plate 16 arranged beneath it will be sucked up by vacuum plate 12 and removed from magazine 13 by the retraction of exposure head 5, with master carriage 7 retracting from exposure head 5 again. Vacuum plate 12 is then lowered onto master carriage 7, thereby permitting the master which has been removed from the magazine to be blown off and thus transferred to master carriage 7. The master, possibly complemented by a mask, is then introduced into exposure head 5 in a conventional manner by means of master carriage 7. After it has been used, the master is then transferred to exit carriage 8 and traversed out of exposure head 5 to the rear, where it can be removed from the repeating copying machine.

In the above described repeating copying machine, the conventional control and drive techniques of machines of this type are utilized. Similarly, the customary techniques for transfer of the master can also be used on machines of this type. Consequently, no further description of the details of the means employed herefor is required.

In spite of the multiple transfers to which the master is subjected along the way from magazine 13 to the interior of exposure head 5, there is no loss of register accuracy, as the position of the master in the exposure head depends primarily upon the position of the master on master carriage 7. This master carriage contains exactly those register means that are also otherwise employed in the system that is utilized, i.e. register pins, for example, which correspond to the above-mentioned register pins 23 on plates 16. However any conventional register system can also be employed, including electronically controlled optical register means.

The basic design of the repeating copying machines according to FIGS. 3 and 4 corresponds to that of the repeating copying machine according to FIGS. 1 and 2. In FIGS. 3 and 4, those components that coincide have the same reference numerals as in FIG. 1 and will not be again described.

In the embodiment according to FIG. 3, as opposed to the embodiment according to FIG. 1, vacuum plate 12 is not attached to exposure head 5 by means of a vertical guideway, but is disposed directly above master carriage 7 on exposure head 5 in such a manner that its vertical travel is only minor. At the end of slide 4, magazine 13 is mounted in a vertical guideway 31, which permits the vertical attitude of magazine 13 to be shifted relative to vacuum plate 12, thereby permitting vacuum plate 12 to be introduced into the selected compartment of magazine 13 by traversing exposure head 5 forward. Otherwise, the function of the repeating copying machine according to FIG. 3 coincides to that according to FIG. 1.

In the embodiment according to FIG. 4, just as in the embodiment according to FIG. 1, vacuum plate 12 is mounted in a vertical guideway 11 on that side of exposure head 5 that faces master carriage 7, thereby permitting the height of vacuum plate 12 to be shifted relative to magazine 13, which, in turn, is fixedly arranged on slide 4 with respect to its height. In this embodiment of the present invention, however, magazine 13 is mounted on an extension 41 of slide 4 in such a manner that it can also be shifted in the direction of arrow 9, and has its own unillustrated drive means, which permits magazine 13 to be traversed as far toward exposure head 5, regardless of the position of exposure head 5, as is required for introduction of vacuum plate 12 attached to exposure head 5 into magazine 13 for transfer of a master. In this manner, magazine 13 can be traversed to exposure head 5, while a master is still being processed, after vacuum plate 12 has been set to the height of that compartment of magazine 13 from which the next master is to be removed. The master can then be picked up by the vacuum plate and magazine 13 retracted to its position of rest at the extreme left in FIG. 4. This also frees master carriage 7, thus permitting the master to already be transferred to master carriage 7 at this point in time. Consequently, master carriage 7 can be traversed into exposure head 5 immediately after the master contained in exposure head 5 has been processed and transferred to the exit carriage, thus permitting the next operating step to follow in very quick succession. Consequently, this embodiment of the automatic repeating copying machine permits significant acceleration of the operating sequence.

The present invention has been described above on the basis of preferred practical examples thereof. Obviously, many modifications and variations of the present invention are possible in the light of the above teachings. It should therefore be understood that within the scope of the appended claims, the present invention may be practiced otherwise than as specifically described. In particular, individual characteristics of the invention can be employed individually or in combination one with the other. As already mentioned above, in addition to the vacuum plate, it is also possible for the feed means to consist of any other desired means of the type known from single sheet feeders of printing presses and copying machines. Moreover, the magazine can also be of highly differing design, for example with fixed compartments, into which the masters are slid and which have stops for defining the attitude of the masters. In addition, the present invention can also be employed with all conventional automatic repeating copying machines, and it is a particular advantage of the present invention that automatic repeating copying machines of this nature can be retrofitted with the means for automatic introduction of the masters according to the present invention.

What is claimed is:

1. A repeating copying machine comprising an exposure head slidably disposed on a slide, with said exposure head being able to be traversed on a machine table by means of said slide and having a master carriage, an exit carriage and feed means arranged for the purpose of transferring masters from a stack of masters attached at that end of said slide which is adjacent to said master carriage to said master carriage, wherein a magazine is disposed at that end of said slide which is adjacent to said master carriage, said magazine having individual compartments for said masters and said magazine and said feed means being mutually adjustable one relative to the other in both the vertical and horizontal planes, thereby permitting said feed means to be brought into engagement with any of said masters contained in said individual compartments of said magazine for the purpose of removing said master from said magazine and transferring it to said master carriage.

2. The repeating copying machine according to claim 1, wherein said magazine is mounted in a vertically adjustable manner in a guideway attached at the end of said slide and said feed means is rigidly attached to that side of said exposure head which faces said magazine.

3. The repeating copying machine according to claim 1, wherein said magazine is rigidly attached to said slide in the vertical direction and said feed means is mounted in a vertically adjustable manner on that side of said exposure head which faces said magazine.

4. The repeating copying machine according to claim 3, wherein said magazine can be traversed on said slide in the same direction as said exposure head and can be traversed conjointly with said exposure head.

5. The repeating copying machine according to claim 1, wherein said feed means is designed as a vacuum plate.

6. The repeating copying machine according to claim 1, wherein said magazine comprises a rack having a plurality of plates arranged in horizontal guide members, said plates serving as carriers for said masters and being provided with means for defining the position of said masters, said means comprising, in particular, locating pins.

7. The repeating copying machine according to claim 6, wherein said guide members are open at an end facing that side of said magazine which is accessible from the exterior, preferably that side which faces away from said exposure head, wherein stops are disposed on said plates, said stops coming into a contacting relationship with appropriate abutments attached to said rack when said plates are in their desired position in said rack, and wherein spring members are attached to said rack, which force said plates into said desired position.

8. The repeating copying machine according to claim 7, wherein said stops are arranged at the ends of that edge of said plates which is adjacent to the open ends of said guide members, with spring strips which are attached to said rack and arranged vertically relative to said plates engaging over said stops.

* * * * *